United States Patent [19]

Brooks

[11] 4,385,593

[45] May 31, 1983

[54] INTRODUCTION OF ALCOHOL-WATER MIXTURE INTO GASOLINE-OPERATED ENGINE

[75] Inventor: Richard J. Brooks, Seattle, Wash.

[73] Assignee: The Chemithon Corporation, Seattle, Wash.

[21] Appl. No.: 253,779

[22] Filed: Apr. 13, 1981

[51] Int. Cl.³ .............................................. F02D 19/00
[52] U.S. Cl. .................... 123/1 A; 123/25 B; 123/25 E; 123/25 L; 123/198 A
[58] Field of Search ................. 123/25 A, 25 E, 25 R, 123/25 B, 25 L, 1 A, 198 A

[56] References Cited

U.S. PATENT DOCUMENTS

| | | | |
|---|---|---|---|
| 2,563,101 | 8/1951 | Colwell et al. | |
| 2,811,146 | 10/1957 | Spillmann | 123/25 B |
| 3,141,447 | 7/1964 | Jernigan | 123/25 B |
| 3,530,842 | 9/1970 | von Brimer | |
| 3,749,376 | 7/1973 | Alm et al. | |
| 3,980,055 | 9/1976 | Webb | 123/25 B |
| 3,991,724 | 11/1976 | Geiser | 123/25 R |
| 4,031,864 | 6/1977 | Crothers | 123/1 A |
| 4,046,119 | 9/1977 | Perry | |
| 4,078,527 | 3/1978 | Yasuda | 123/25 B |
| 4,122,803 | 10/1978 | Miller | 123/25 C |
| 4,150,639 | 4/1979 | Buszek | 123/25 B |

OTHER PUBLICATIONS

*Chicago Sun Times,* Oct. 9, 1980, "Device Ups Mileage, Says EPA".

*Primary Examiner*—Ira S. Lazarus
*Attorney, Agent, or Firm*—Merriam, Marshall & Bicknell

[57] ABSTRACT

Alcohol and water are mixed as liquids in a volume ratio of water to alcohol in the range 0.3-1.0 to 1. The liquid mixture is heated in heat exchanging relation with the exhaust conduit of a gasoline operated internal combustion engine, to convert the mixture to a gaseous state which is then combined with a mixture of gasoline and air for introduction into the engine. The water-alcohol mixture is 3-14 vol. % of the gasoline.

3 Claims, 3 Drawing Figures

INTRODUCTION OF ALCOHOL-WATER MIXTURE INTO GASOLINE-OPERATED ENGINE

BACKGROUND OF THE INVENTION

The present invention relates generally to methods for adding a fuel to a gasoline-operated internal combustion engine and more particularly to a method for adding a gasoline fuel also containing a mixture of alcohol and water.

In the past, attempts have been made to add a mixture of alcohol and water (or water alone) to gasoline as part of the fuel for a gasoline-operated internal combustion engine. Typically, a liquid mixture of alcohol and water, or water alone, is stored in a container from which vapors of the mixture are withdrawn by bubbling through the container an external gas (e.g., air or exhaust gas from the internal combustion engine) or by creating a suction at the exit from the container, produced by a moving stream of exhaust gas. The mixture of water and alcohol vapors thus produced is relatively dilute, there being a relatively large volume of air or exhaust gas commingled with it, and some of the water and alcohol is in the form of small liquid droplets.

An example of a prior art method in which the water-alcohol mixture is withdrawn from its container as such vapors, by bubbling an external gas through the mixture, is shown in Alm et al., U.S. Pat. No. 3,749,376. An example of a prior art method in which the water-alcohol mixture is withdrawn from its container as such vapors due to a suction created by a stream of exhaust gas, with which the withdrawn water-alcohol mixture is then mixed is shown in von Brimer, U.S. Pat. No. 3,530,842. The vapors of water and alcohol thus formed by the prior art methods are used for cooling the internal combustion engine into which the alcohol-water mixture is introduced. Accordingly, in these prior art methods, it is important that these vapors consist, at least in part, of droplets of liquid which can be converted from liquid into gas to utilize the heat-absorbing characteristics of the conversion from the liquid to the gaseous state.

In Perry, U.S. Pat. No. 4,046,119, vapors of water alone are withdrawn from a container by bubbling air and exhaust gas through the container to provide a mixture of air, exhaust gas and water vapor which is then preheated before injection into the intake manifold of the engine.

In Colwell et al., U.S. Pat. No. 2,563,101, a liquid additive including water and alcohol, among other things, is mixed with gasoline and air at the intake manifold of an internal combustion engine.

A draw-back to withdrawing the water-alcohol mixture from its storage container as a vapor is that, in this condition, especially when the water-alcohol mixture is combined with an external gas, such as air or the engine's exhaust gas, it is difficult to meter or measure accurately a controlled amount of the water-alcohol mixture in relation to an amount of gasoline with which it is to be mixed. A disadvantage to introducing the alcohol-water mixture into the engine mixed with exhaust gas is that the latter will load down the engine with a gas volume which has already gone through the engine once and which, for the most part, has already been combusted.

SUMMARY OF THE INVENTION

The drawbacks and disadvantages of the prior art methods for adding water-alcohol mixtures to a gasoline-operated internal combustion engine are eliminated in a method in accordance with the present invention.

Essentially, the water and alcohol are withdrawn from their storage container as a liquid and a measured flow of this liquid is directed further downstream. The water and alcohol are provided and maintained as a liquid stream until after the measuring step. As used herein, the term "liquid stream" refers to a condition in which the liquid is in the form of a continuous phase, rather than as discrete droplets constituting a discontinuous phase in a continuous phase composed of air or exhaust gas or both.

After it has been measured, the mixture of water and alcohol is heated, using heat generated by the combustion in the engine, to convert the alcohol and water from a liquid state to a gaseous state. This is a true, relatively concentrated gaseous state, rather than being merely a dilute vapor, and the water and alcohol are not present as small, finely divided droplets. After the water and alcohol have been converted into a gas, the mixture of gaseous water and alcohol is combined with a mixture of gasoline and air and then fed into the internal combustion engine.

The heating step may be performed by conducting the water-alcohol mixture in heat-exchanging relation with the exhaust system from the engine. However, in the heating step, as well as all other steps, upstream of the engine, direct contact between the water-alcohol mixture and the exhaust gas is avoided. Air is combined with the alcohol-water mixture and gasoline at the entry to the engine, but no external gas is combined with the water-alcohol mixture until after the heating step.

The purpose of the heating step is to recycle back to the engine some of the heat energy withdrawn from the engine through the exhaust gas. More particularly, the air-gasoline mixture is preheated by the hot water-alcohol mixture when the two mixtures are commingled before entering the engine cylinders. The alcohol in the mixture is a fuel, and the water in the mixture is provided to utilize the relatively high sensible heat possessed by the water. As a result of including water in the mixture, there is extracted from the exhaust and recycled back to the engine more heat than would be available if alcohol alone were being used to extract heat from the exhaust. The water also removes carbon from the engine. As a result of using the alcohol-water mixture, there is less pinging and dieseling of the engine.

Other features and advantages are inherent in the invention claimed and disclosed or will be apparent to those skilled in the art from the following detailed description in conjunction with the accompanying diagrammatic drawings.

DETAILED DESCRIPTION

Figure 1:
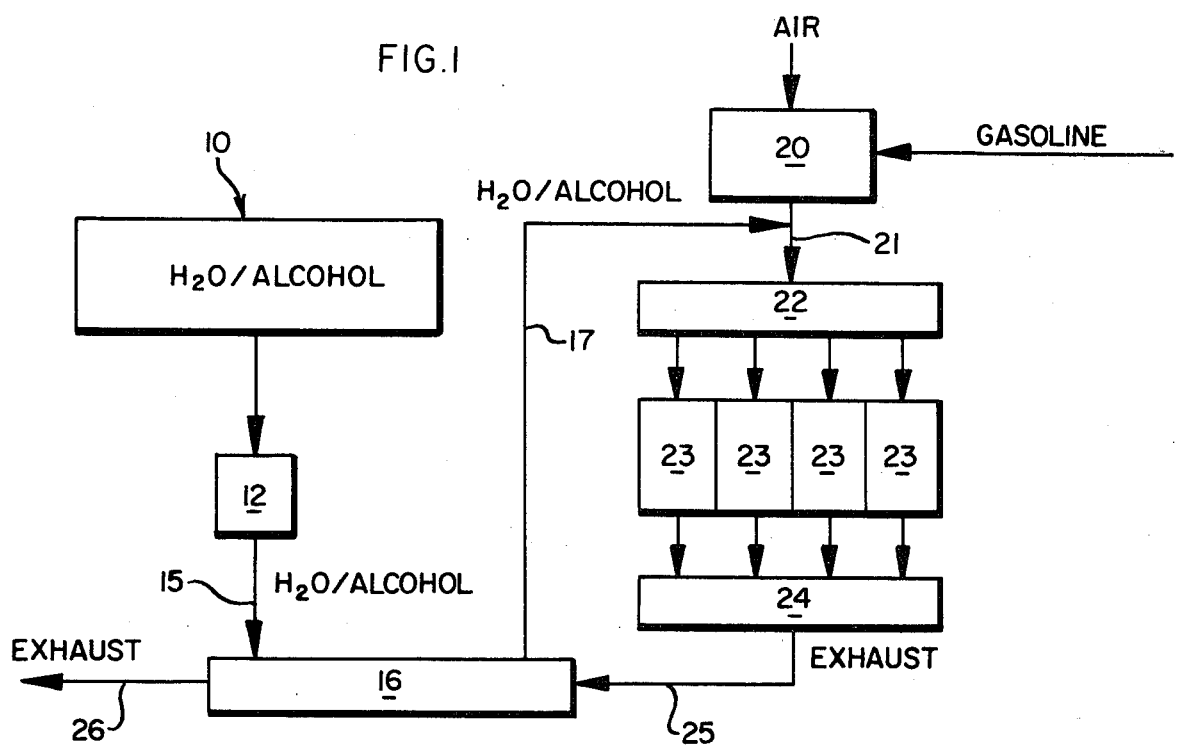
FIG. 1 is a flow diagram illustrating an embodiment of a method in accordance with the present invention.

Referring initially to FIG. 1, a mixture of water and alcohol is withdrawn from container 10 through a rotameter 12. The mixture in container 10 has a volume ratio of water to alcohol in the range 0.3–1.0 to 1.

The liquid mixture withdrawn from container 10 flows through rotameter or adjustable flow control valve 12 from which the mixture is conducted through a line 15 to a heat exchanging relation with an exhaust conduit 16. The heating step at exhaust conduit 16 converts the water-alcohol mixture from a liquid state to a gaseous state which is then conducted away from exhaust conduit 16 through a line 17.

Indicated at 20 is a carburetor into which air and gasoline are introduced and mixed and from which a mixture of air and gasoline flows through a conduit 21 leading to the intake manifold 22 of an engine having a plurality of cylinders or combustion chambers, 23, 23. The gaseous mixture of water and alcohol is introduced into conduit 21 where it is mixed with the gasoline-air mixture from carburetor 20. The gaseous water-alcohol mixture enters the cylinders 23, 23 of the engine with the air-gasoline mixture from carburetor 20. Exhaust gas is withdrawn from cylinders 23, 23 into exhaust manifold 24 from which it is withdrawn through an upstream portion 25 of exhaust conduit 16 which also has a downstream portion 26 through which the exhaust gas passes after exchanging some of its heat to the water-alcohol mixture at exhaust conduit 16.

The water-alcohol mixture is drawn through the system by suction from the engine. More particularly, during normal engine operation, intake manifold 22 is at a pressure below atmospheric while container 10 is at atmospheric pressure, thus causing the suction described above. If desired, a pump could be used to draw the water-alcohol mixture through the system.

Figure 2:
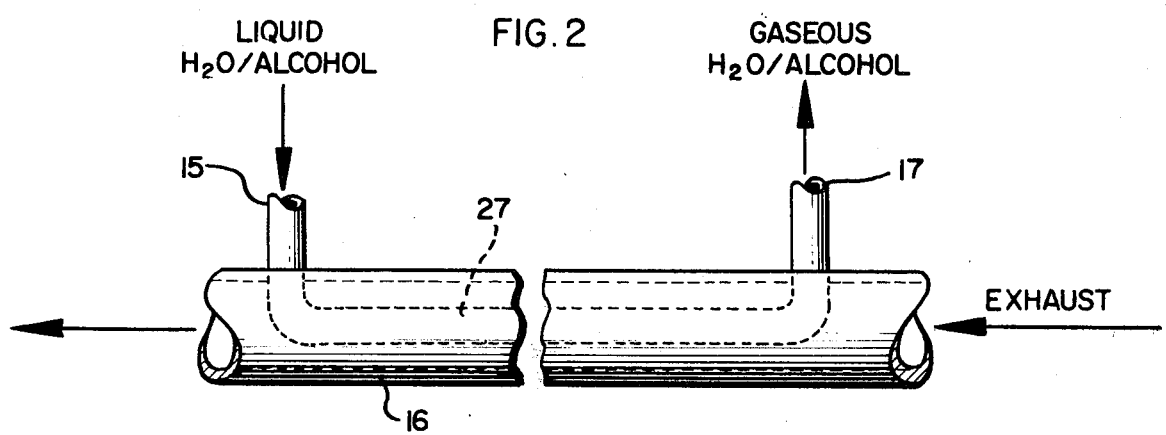
FIG. 2 is a fragmentary view illustrating one embodiment of a heating step in accordance with the present invention.
Figure 3:
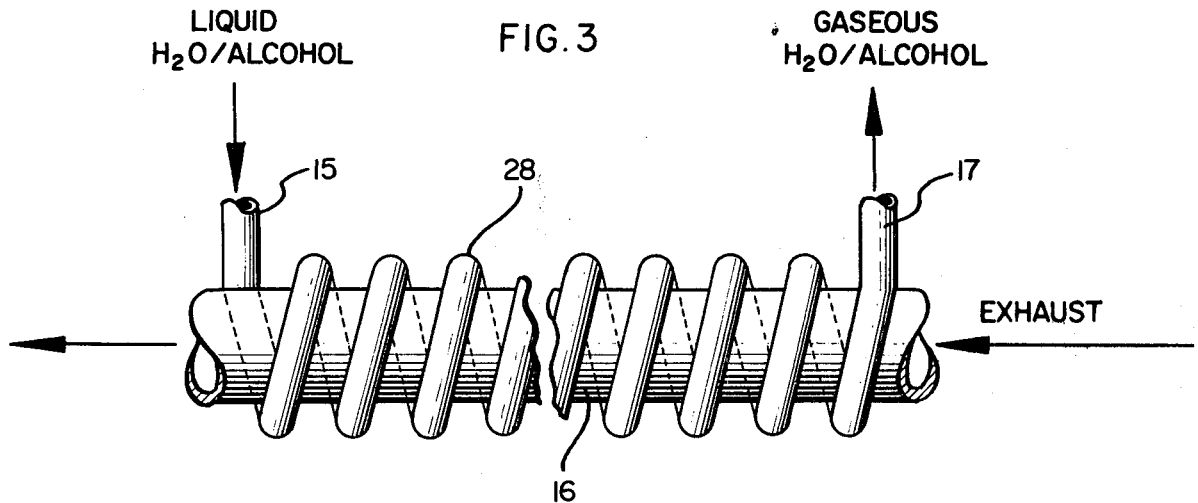
FIG. 3 is a fragmentary view illustrating another embodiment of a heating step in accordance with the present invention.

The heat exchange relation between the water-alcohol mixture and the exhaust from the internal combustion engine is performed in a manner which avoids direct contact between the water-alcohol mixture, or its components, and the exhaust. Examples of two embodiments for effecting this heat exchanging relation are illustrated in FIGS. 2 and 3. In the embodiment of FIG. 2, the liquid water-alcohol mixture enters an internal tube 27 surrounded by exhaust conduit 16. In the embodiment of FIG. 3, the liquid water-alcohol mixture passes through a coil 28 wrapped around the exterior of exhaust conduit 16. In both embodiments, the water-alcohol mixture is converted into a gas by the time it enters line 17.

The mixture of gaseous water and alcohol is combined with the mixture of gasoline and air in a predetermined measured amount so that the mixture of water and alcohol is about 3–14 vol. % of the gasoline (12 vol. % preferred). The amount of water-alcohol to be combined with the gasoline is determined by setting rotameter 12 for the desired flow rate (e.g. 12 vol. % of the average flow rate of the gasoline). For reasons noted below, it is important to control accurately the amount of the water-alcohol mixture in relation to the amount of gasoline, within the above-noted range, and therefore it is important that the alcohol and water mixture be provided and maintained as a stream of liquid until after it has been measured. If the water and alcohol in the mixture were withdrawn from container 10 as vapors, it would be much more difficult to measure accurately and control the amount of the water-alcohol mixture in relation to the amount of gasoline. Accordingly, the water-alcohol mixture is maintained as a liquid stream until after rotameter 12, and no external gas is combined with the mixture of water and alcohol until air is combined therewith at conduit 21.

By adding a mixture of water and alcohol in the ratios described above and in the relative amount described above, the mileage per gallon of fuel consumed is increased by as much as 10–20%. This improvement in mileage is better than that obtained with either water alone or alcohol alone in like amounts.

The alcohol in the mixture functions as a fuel and improves the octane rating of the gasoline to which the mixture is added. A function of the water is to aid in removal of carbon from the engine. Another function of the water is to absorb heat from the exhaust while the mixture of water and alcohol is in heat exchange relation with the exhaust. Water has a higher sensible heat than alcohol and can absorb more heat from the exhaust than can the alcohol. It is desirable to maximize the amount of heat absorbed from the exhaust by the mixture of water and alcohol. Accordingly, in addition to converting the water-alcohol mixture to a gaseous state at exhaust conduit 16, it is also desirable to superheat the gaseous state during the heating step. Because the water has a higher sensible heat than does the alcohol, it is desirable to have a relatively high volume ratio of water to alcohol, e.g., in the aforementioned range 0.3–1.0 to 1.

If the amount of water-alcohol mixture added to the gasoline were too low, little benefit would be obtained from the addition of the mixture; and if the amount were too high, there would be a decrease in engine performance due to the presence of too much water. If the ratio of water to alcohol were too low, the amount of heat transfer from the heat exchanger would be relatively too low; and if the ratio were too high, there would be a decrease in engine performance due to the presence of too much water. A water to alcohol volume ratio in the range 0.3–1 and a water-alcohol mixture in the range 3–14 vol. % of the gasoline gives a desirable combination of properties.

With regard to superheating, a mixture of water and alcohol boils at a temperature below the boiling point of water. The more alcohol present, the lower the boiling point. Therefore, a superheated mixture of alcohol and water would have a temperature above the boiling point of the mixture up to and possibly above the boiling point of water, 100° C. (212° F.). The extent of the superheating depends upon the extent (area) of heat exchanging contact at heat exchanger 16.

A method in accordance with the present invention increases the combustion efficiency of the engine and reduces the uncombusted residual fuel value in the exhaust gas. Accordingly, little would be gained by mixing some of the exhaust gas with the water-alcohol mixture and recycling it back to the internal combustion engine. Instead, more can be gained by maximizing the heat energy recovered from the exhaust, utilizing the indirect heat exchanging relation at exhaust conduit 16. The heat absorbed from the exhaust is then transferred by the superheated gaseous water-alcohol mixture to the gasoline which, as a result, becomes hotter and more fully vaporized.

As noted above, an advantage of a method in accordance with the present invention resides in the improved mileage obtained. In contrast, where the fuel is gasohol (a mixture of gasoline and alcohol with no water), there is no mileage improvement.

Another advantage of a method in accordance with the present invention is that, by employing a mixture of alcohol and water, the cost of producing the alcohol is reduced. This is because water is normally present in commercially available alcohol, unless intentionally removed. Therefore, it is cheaper to produce alcohol in which not all the water has been removed therefrom.

When employing a mixture of gasoline and alcohol, the alcohol used must be anhydrous because any water therein will separate out once the alcohol is mixed with the gasoline, thereby losing whatever advantage might be obtained from the water. However, when the water-alcohol mixture is stored separately and gasified before mixing with the gasoline, in accordance with the present invention, the water does not separate out, and its advantages are retained.

The foregoing detailed description has been given for clearness of understanding only, and no unnecessary limitations should be understood therefrom as modifications will be obvious to those skilled in the art.

I claim:

1. A method for improving the fuel efficiency of an engine having an internal combustion chamber wherein a first mixture containing gasoline and air is fed into said internal combustion chamber, said first mixture is combusted in said chamber, and the exhaust from said combustion is withdrawn from said chamber, said method comprising the steps of:

providing a second mixture having water and alcohol as components thereof in a volume ratio of water to alcohol in the range 0.3-1.0 to 1;

containing said water and said alcohol separate and discrete from said gasoline;

withdrawing a measured flow of said second mixture;

combining said measured flow of said second mixture with said first mixture before the first mixture is fed into said internal combustion chamber, without previous mixing of said gasoline and said alcohol;

the measured flow of said second mixture being about 3-14 vol. % of said gasoline;

said alcohol and water in said second mixture being provided and maintained as a liquid stream until after said second mixture has been measured;

and heating said second mixture before the combination thereof with the first mixture, using heat generated by said combustion, to convert the alcohol and water in said second mixture from a liquid state to a gaseous state;

the totality of said method being performed without direct contact between said second mixture or its components and said exhaust.

2. A method as recited in claim 1 wherein: said gaseous phase is superheated during said heating step.

3. A method as recited in claim 1 wherein: no external gas is combined with said second mixture until after said heating step.

* * * * *